United States Patent [19]
Zenobi

[11] Patent Number: 6,111,375
[45] Date of Patent: Aug. 29, 2000

[54] APPARATUS FOR REGENERATING ENERGY FROM THE DYNAMIC INTERACTIONS BETWEEN GROUND AND RUNNING VEHICLES

[76] Inventor: Carlo Alberto Zenobi, Viale Matteotti, 4, I-62029 Tolentino (Macerata), Italy

[21] Appl. No.: 09/101,834

[22] PCT Filed: Jan. 17, 1997

[86] PCT No.: PCT/IT97/00009

§ 371 Date: Oct. 27, 1998

§ 102(e) Date: Oct. 27, 1998

[87] PCT Pub. No.: WO97/26145

PCT Pub. Date: Jul. 24, 1997

[30] Foreign Application Priority Data

Jan. 19, 1996 [IT] Italy .................................. MC96A0006

[51] Int. Cl.⁷ .................................................. B60K 1/00
[52] U.S. Cl. ......................... 318/376; 180/65.3; 180/65.1
[58] Field of Search .......................... 60/370; 180/65 D, 180/65 R, 53 R, 165, 65.3, 65.1; 290/45; 318/376, 153

[56] References Cited

U.S. PATENT DOCUMENTS

| | | |
|---|---|---|
| 1,557,570 | 10/1925 | Eckman et al. . |
| 3,921,746 | 11/1975 | Lewus ................................... 180/53 R |
| 4,024,926 | 5/1977 | Butoi ..................................... 180/65 D |
| 4,218,624 | 8/1980 | Schiavone ................................ 290/45 |
| 4,295,538 | 10/1981 | Lewus .................................... 180/165 |
| 4,381,041 | 4/1983 | Butoi ....................................... 180/65 |
| 4,981,309 | 1/1991 | Froeschle et al. ..................... 280/707 |
| 5,091,679 | 2/1992 | Murty et al. ........................... 318/153 |
| 5,337,560 | 8/1994 | Abdelmalek .............................. 60/370 |

FOREIGN PATENT DOCUMENTS

| | | |
|---|---|---|
| 0363158 | 4/1990 | European Pat. Off. . |
| 2254453 | 7/1975 | France . |
| 2624374 | 12/1977 | Germany . |

*Primary Examiner*—Bentsu Ro
*Assistant Examiner*—Rita Leykin
*Attorney, Agent, or Firm*—Stevens, Davis, Miller & Mosher, L.L.P.

[57] ABSTRACT

An apparatus for regenerating energy from the dynamic interactions between the ground and a running vehicle consisting of means (1, 2) for transforming the energy of the movement of at least one suspension or shock absorber of the vehicle into electrical energy which can be stored in batteries (7) located in the vehicle or, alternatively, into mechanical work; in the latter case, there are additionally provided means (22, 23) for storing said mechanical work under the form of elastic potential energy in the vehicle.

6 Claims, 2 Drawing Sheets

APPARATUS FOR REGENERATING ENERGY FROM THE DYNAMIC INTERACTIONS BETWEEN GROUND AND RUNNING VEHICLES

The present invention relates generally to the field of transportation and, more particularly, the utilization of the dynamic actions, developed during the running of any vehicle and caused by the dynamic interactions between the latter and the unevenness of the ground on which the vehicle is running, in order to regenerate the dissipated energy and to store it for later use.

The energy of the dynamic actions caused by the relative movement between vehicle and ground is currently dissipated by various forms of shock absorbers so as not to upset the vehicle attitude.

The existing actuators of the vehicle shock absorbers utilize substantially mechanical absorber means (springs) or hydraulic means (pistons) or mixed systems with air cushion.

It is already known, from EP 363158, an apparatus for regenerating energy from the dynamic interactions between the ground and a running vehicle consisting of linear motor for transforming the energy of the movement of the suspension or shock absorber of the vehicle into electrical energy which can be stored in batteries located in the vehicle. In this apparatus are used permanent magnets of alternate polarity, but these devices are usually characterized by problems of efficiency.

The present invention overcomes the problems of the prior art providing the use of a shock absorber which transforms the currently dissipated energy of the dynamic interactions between vehicle and ground into an useful form of energy which can be stored even with the unavoidable loss due to the efficiency of the transformation.

More particularly, in the present invention it is provided the use of coils both in the stationary and in the moving parts of the suspension.

In view of the very wide field of application of such a device and the infinite range of existing vehicles it is evident that an apparatus regenerating energy and carrying out the same technical solution for all the types of vehicles is not conceivable because, among others, the specific vehicle constructions could in some case require excessively complicated, expensive transducers.

The invention will be better understood from the following detailed description of a preferred embodiment of the apparatus for regenerating and transforming energy, for example, into electric energy, said embodiment being capable of covering a considerable portion of the range of existing vehicles.

Such embodiment is schematically shown only by way of example in the accompanying drawings. In the drawings.

Figure 1:
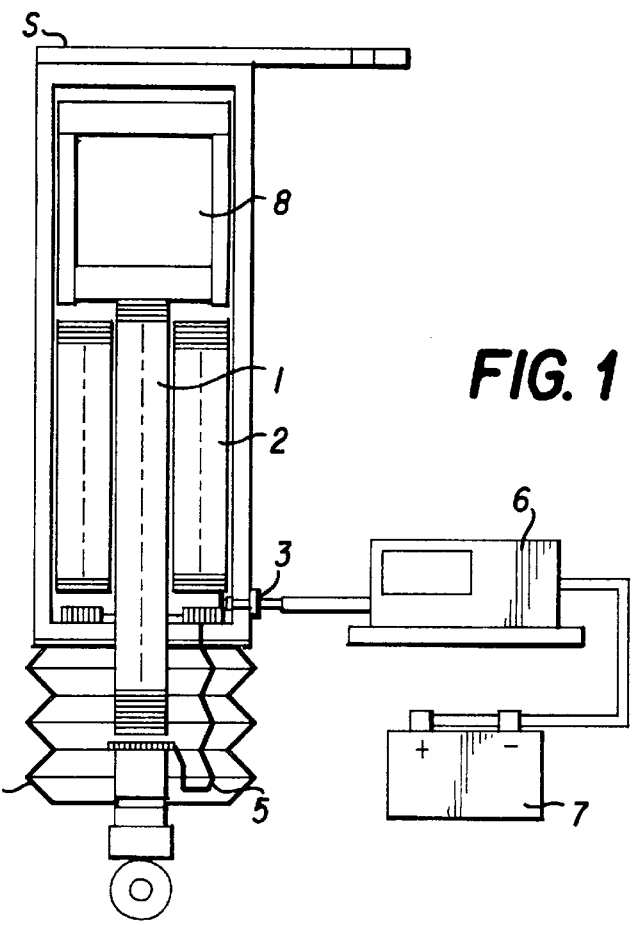
FIG. 1 shows the diagram of a preferred embodiment of the invention

With reference to FIG. 1, the apparatus consists of a suspension including a electrical linear generator with the moving part 1 (equivalent to the rotor) rigidly connected to the not suspended parts (wheels) which follow the unevenness of the ground on which the vehicle is running, and with the stationary part 2 (stator) connected to the vehicle frame or body S.

The movement transmitted from the wheels to the moving part 1 produces an electromotive force in the stationary part or stator 2 which in turn generates a current through a connecting cable 5 at output connector 3, which current is fed to a diod rectifier 6 and then to a lead battery 7 of capacity adapted to the used generator.

In the described embodiment there is provided a covering bellows 4 capable of protecting the inside of moving part 1 and stationary part 2 from the environmental agents which could come between and damage the moving and the stationary parts. Particularly, said bellows 4 has one end connected to the casing of the stationary part and the other end is connected to that end of the moving part 1 which is not engaged in the generation of the electromotive force.

Connecting cable 5 feeding the excitation current of the moving part 1 to the battery 7 of the vehicle through connector 3 and rectifier 6 is located within such protection bellows 4 having such a length as to cover the whole stroke of the relative movement between stationary part 2 and moving part 1. The upper end of the moving part 1 is integral with an elastic member 8 such as a piston acting on a volume of compressible fluid.

Figures 2, 2A:
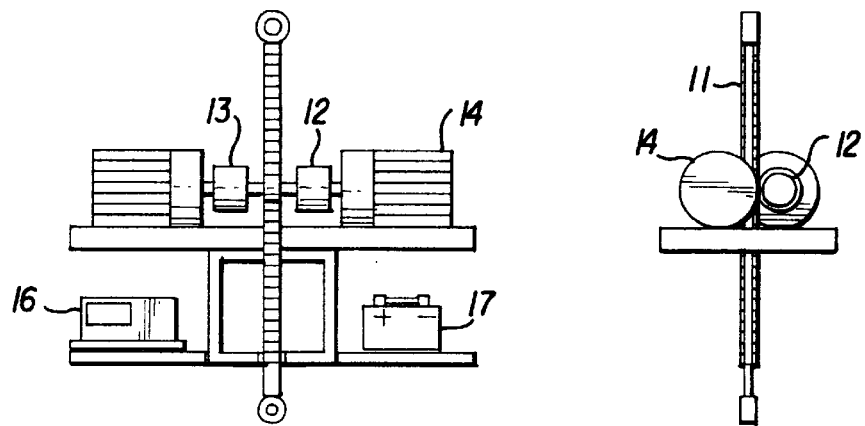
FIGS. 2 and 2a show a second embodiment of the present invention.

With reference to FIG. 2, a second embodiment of the invention is provided particularly in case that the forces coming into play do not allow the above-described linear generator to be used because of their cumbersome size with respect to the room available on board of the vehicle.

In such a case, there is provided an electromechanical conversion system which regenerates the kinetic energy from the relative movements between body and wheels.

Such a system, which is particularly adapted for heavy-weight vehicle with wider oscillations, however, of lower frequency, transforms the alternate movement of the axis of the suspension into a rotary movement by means of a gearwheel-rack mechanism.

The moving part of the shock absorber ends in a rod provided with two longitudinal racks 11 facing each other. Said racks engage two pinion gears 12 which are journalled through one-way synchro-couplings 13 on two conventional alternators 14 integral with the body.

The vehicle is kept in the rest position by spring suspensions of the conventional type, however, of lower rigidity, also acting as limit stops for the racks 11. Actually, it is necessary to prevent the ends of the racks from colliding against the pinion gears upon reaching the end of the stroke.

If the rotor of an alternator is caused to rotate in one direction by the upward thrust imparted by the rack integral with the wheel and if the following thrust is in the opposite direction, both one-way syncro-couplings disengage from the rotor which otherwise would rotate in the opposite direction.

It should be appreciated that, in case of a following upward thrust of the rack, the rotor could be rotating at a different speed from that of the corresponding pinion gear because of the inertia of its flywheel. In such a case, according to another feature of the invention, each one-way synchro-coupling causes the speed of the rotor to rise, if the thrust is sufficient to allow it, and does not cause any slowing down, if the thrust of the rack is not sufficient.

In other words, the movement that the racks 11 transmit to the respective pinion gears 12 is transferred to alternators 14 through couplings 13 only in one way, while in the opposite way the connection is idle.

Obviously, the pinion gear controlling the downward movement performs a similar function with opposite direction of rotation in order to utilize also the downward phase of movement of the racks 11.

In the case described in FIG. 2, in which it is possible to place the alternators in antisymmetric positions to each other, the two one-way synchro-couplings 13 are exactly the same. In this case, the electrical system consist of two alternators 14 for each shock absorber, one or more diode rectifiers 16 and one or more batteries 17.

Figure 3:
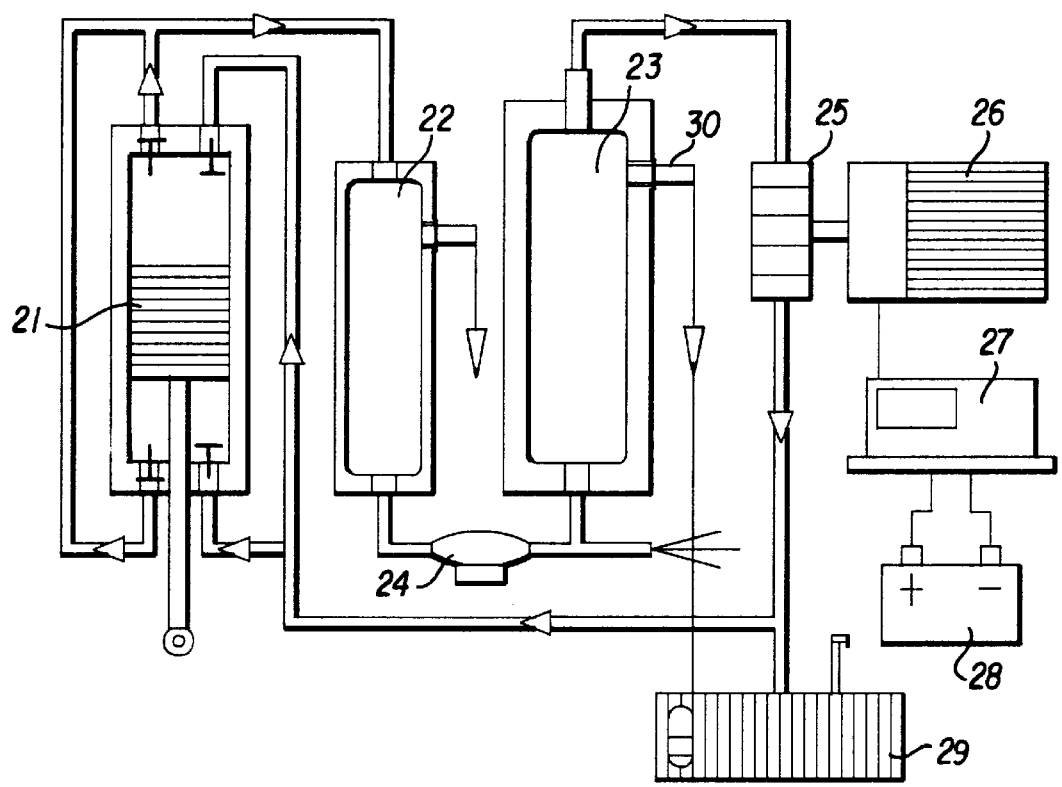
FIG. 3 shows a third embodiment of the present invention.

A third embodiment, shown in FIG. 3, regenerates the energy from the relative movements between body and wheels through a conversion system of the oleodynamic type.

Such apparatus has the rod of the hydraulic shock absorber provided with a spring-oleodynamic piston assembly. The movement of a double-acting oleodynamic piston 21 controlled by the alternate rectilinear movement of the shock absorber cause the pressure of the user circuit to rise. Said circuit feeds, through a check valve, an oleodynamic accumulator 22 which in turn feeds another accumulator 23 serving all of the suspensions through a pressure regulator 24.

The energy stored under the form of a pressure is used to charge a battery 28 through a regulator 27 by means of an oleodynamic motor 25 connected to an alternator 26.

The operating fluid of the motor is discharged to a tank 29 from which it is sucked by each piston 21.

As already mentioned, each pressure regulator 24 controls the inner pressure of the respective accumulator 22 by feeding the fluid to the common accumulator 23 and then to motor 25 only when the value of the pressure is sufficient. Accordingly, the vehicle attitude is kept due to the fact that a minimum value of pressure is held in each shock absorber.

Obviously, said accumulators 22 and 23 have elastic means such as a compressible fluid pocket or chamber or a membrane which engages a spring and is compressed as the pressure rises.

The common accumulator 23 is provided with a device 30 that, in case of overpressure, causes the automatic fluid reflux to the oil tank 29. A further safety valve preventing in any case an overpressure of the common accumulator 23 may be also provided.

According to the invention, each shock absorber has a hydraulic piston chamber provided with a pair of check valves for each piston action.

Each pair is formed of the check valve in the delivery circuit of the accumulator 22 and the check valve in the suction circuit which is connected to the oil tank 29. An oil cooling radiator may be also provided downstream of the oleodynamic motor 25.

In case the vehicle is a storage battery propulsion or a mixed propulsion vehicle, the stored electrical energy may be utilized for the propulsion making use of the electrical system and improving the range of the vehicle.

Of course, in case of other vehicles, the stored energy may be utilized in the vehicle for any other purpose as it is delivered by the accumulators of the electrical system. Thus, it is possible to provide electrically operated devices instead of mechanically operated ones such as compressors, pumps; and so on.

Advantageously, according to the invention, it is also possible to provide an apparatus for regenerating the energy of the dynamic interactions between a vehicle and the ground which, instead of storing electrical energy in the batteries of the vehicle, transforms the energy from the movement of at least one suspension or shock absorber or the vehicle into useful mechanical work and then stores said mechanical work under the form of elastic potential energy in the vehicle. For example, this could be carried out by means of a hydraulic pump operated by the movement of the shock absorber compressing an elastic member such as a spring or a compressible fluid pocket.

In order to support the above description of the present invention it is useful to take into consideration a simple calculus of the dynamic actions developed between a vehicle and the ground on which it is running. Reference is made for the analysis to a vehicle having the following characteristics:

| | |
|---|---|
| mass | $M = 1000$ kg |
| average speed | $V = 90$ km/h $= 25$ m/s |
| Suspensions: | |
| resonance frequency | $F = 80$ cycle/min $= 1\text{-}1.3$ Hz |
| absorber ratio | $R = \dfrac{\text{force of extension}}{\text{force of compression}} = \dfrac{4}{1}$ |
| damping coefficient | $K = F/V_p$, $K_e = 4000\,N\,s/m$ |
| | $K_c = 4000\,N\,s/m$ |

Assuming that the unevenness of the ground are formed of obstacles having a height of 2 cm at a distance of one meter from one another, the work of a suspension for passing over an unevenness under critical damping condition is:

$$L = F_c \times H + F_e \times H$$

Upon passing over the unevenness it is supposed that the speed of the damping piston is half the maximum allowed speed both during compression and extension ($V_{p\ max} = 0.5$ m/s) and that the vehicle's centre of gravity describes a rectilinear trajectory:

$$L = K_c \times V_p \times H + K_e \times K_p \times H$$

$$L = 1000 \times 0.25 \times 0.02 + 4000 \times 0.25 \times 0.02 = 5 + 20 = 25 J$$

$$L = 25 \times 4 = 100 J$$

$$P = L \times N = 100 \times 25 = 2500 W$$

Calculus of the running power:

$$P = R_t \times V/\eta$$

$$R_t = R_{rolling} + R_{air}$$

$$R_{rolling} = t \times \text{Weight} = 0.03 \times 10000 = 300 N$$

$$R_{air} = K_p \times A \times V = 0.3 \times 1.8 \times 25^2 = 337.5 N$$

$$P = (300 + 337.5) \times 25/0.8 = 20000 W$$

Therefore, the power regeneration is equal to the ratio between regenerated power and running power.

$$\frac{2500}{20000} = 0.125 = 12.5\%$$

The above calculus is based on a rather simplified, limitative model, therefore, the amount of regenerated power is reasonably to believe greater than that calculated.

I claim:

1. An apparatus for regenerating energy from the dynamic interactions between the ground and a running vehicle having not suspended parts (wheels), comprising:
   means for transforming energy of movement of at least one suspension or shock absorber of the vehicle into electrical energy which can be stored in batteries located in the vehicle, said at least one suspension or shock absorber comprising an electrical linear generator with a moving part (1) as a rotor and a stationary part (2) as a stator;

the moving part (1) having an end for rigidly connecting to the not suspended parts (wheels) which follow the unevenness of the ground on which the vehicle is running;

the stationary part (2) having a portion for connecting to the vehicle frame or body (S), wherein movement of said moving part (1) relative to said stationary part (2) generates an excitation current, a covering bellows connected to a casing of the stationary part and connected to a portion of the moving part projecting from said casing, a connecting cable (5), said cable (5) attached to moving part (1) and functionally attachable to the battery of the vehicle for feeding the excitation current of moving part (1) to the battery of the vehicle;

said connecting cable (5) being located within the covering bellows (4), the covering bellows having such a length as to cover the whole stroke of the relative movement between said stationary part (2) and said moving part (1);

said covering bellows (4) being capable of protecting said moving part (1) and said stationary part (2) from environmental agents which could come between and damage the moving and stationary parts moving relative to one another.

2. The apparatus for regenerating energy of claim 1, wherein the movement transmitted from the wheels to the moving part (1) produces an electromotive force in the stationary part or stator (2) which in turn generates a current at the output connector (3) which is fed to a diode rectifier (6) and then to a lead battery (7) of capacity adapted to the used generator.

3. The apparatus for regenerating energy of claim 1, wherein said bellows (4) has one end connected to the casing of the stationary part and the other end is connected to that end of the moving part (1) which is not engaged in the generation of the electromotive force.

4. The apparatus for regenerating energy of claim 1, wherein the upper end of the moving part (1) is integral with elastic means (8) such as a piston acting on a spring or a chamber containing a compressible fluid.

5. The apparatus for regenerating energy of claim 1, wherein in case the vehicle is a storage battery propulsion or a mixed propulsion vehicle, the stored electrical energy may be utilized for the propulsion making use of the electrical system and improving the range of the vehicle.

6. The apparatus for regenerating energy of claim 1, wherein in case of other vehicles without electrical propulsion, the stored energy may be utilized in the vehicle for any other purpose, such as the operation of electrical devices, and may be delivered by the accumulators of the electrical system.

* * * * *